United States Patent
Fukushi

(10) Patent No.: US 11,706,356 B2
(45) Date of Patent: Jul. 18, 2023

(54) INPUT DEVICE AND IMAGE FORMING APPARATUS

(71) Applicant: CANON KABUSHIKI KAISHA, Tokyo (JP)

(72) Inventor: Kenji Fukushi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/376,370

(22) Filed: Jul. 15, 2021

(65) Prior Publication Data

US 2021/0344806 A1 Nov. 4, 2021

Related U.S. Application Data

(63) Continuation of application No. PCT/JP2020/005008, filed on Feb. 4, 2020.

(30) Foreign Application Priority Data

Feb. 5, 2019 (JP) .................................. 2019-018768

(51) Int. Cl.
*H04N 1/00* (2006.01)

(52) U.S. Cl.
CPC ................. *H04N 1/00384* (2013.01)

(58) Field of Classification Search
None
See application file for complete search history.

(56) References Cited

U.S. PATENT DOCUMENTS

| 2011/0128247 A1* | 6/2011 | Sensu ................... G06F 3/0227 345/173 |
| 2021/0084177 A1 | 3/2021 | Fukushi |

FOREIGN PATENT DOCUMENTS

| JP | 2002-244795 A | 8/2002 |
| JP | 2007-296781 A | 11/2007 |
| JP | 2011-118584 A | 6/2011 |

OTHER PUBLICATIONS

Kadokura Masashi, Fuji Xerox Co Ltd, Image Forming Apparatus, 2007, Machine Translation of JP 2007296781 (Year: 2007).*
International Search Report and Written Opinion for International Patent Application No. PCT/JP2020/005008, dated Mar. 31, 2020.

\* cited by examiner

*Primary Examiner* — Dov Popovici
(74) *Attorney, Agent, or Firm* — Venable LLP

(57) ABSTRACT

An input device that is mountable on an image forming apparatus includes a plurality of numerical keys arranged as hardware keys, a connector provided in a casing of the input device and configured to electrically connect the image forming apparatus and the input device, and a USB port provided in the casing and configured to USB-connect external equipment, which is different from the image forming apparatus, to the input device. As viewed in an up-down direction that the numerical keys are pressed, the USB port is provided on a front side surface of the casing.

16 Claims, 12 Drawing Sheets

INPUT DEVICE AND IMAGE FORMING APPARATUS

TECHNICAL FIELD

The present invention relates to an input device including a hardware key and to be externally attached to an image forming apparatus and to the image forming apparatus to which this input device is externally attached.

BACKGROUND ART

Conventionally, for example, an image forming apparatus of an electrophotographic type has been widely used as a copying machine, a printer, a facsimile (machine), a multi-function machine having a plurality of functions of these (machines), and the like. In such an image forming apparatus, in order to permit a user to perform input of numerical values such as the number of image formed sheets and a facsimile number or input of processing such as a start, a stop, or the like of image forming processing, for example, an operating portion (display portion) capable of displaying and inputting information on a front side upper portion of an apparatus main assembly is provided. As such an operating portion, for example, one provided with a touch panel where input keys (software keys) are displayed on a display screen and with hardware keys such as numerical keys, a start key, and a stop key has become widespread. The hardware keys are, for example, disposed adjacent to the touch panel.

In recent years, for example, upsizing of the touch panel has advanced for the reason that a numeric key portion comprised of software keys is displayed on the touch panel or the like reason, so that downsizing of the operating portion has been desired. Therefore, an input device capable of realizing input of all pieces of information by using only the touch panel without providing the numeric key portion and the start key which are comprised of the hardware keys has been developed (Japanese Laid-Open Patent Application (JP-A) 2011-118584). In this input device, in general, the information is capable of being inputted only by the touch panel, but in accordance with user's desire, as an option, an external input device (for example, a numeric key unit) including a numeric key portion comprised of hardware keys is made connectable.

It is desired that such an external input device is disposed just beside the touch panel of the image forming apparatus in consideration of an operating property of the user. That is, this is because when the external input device is disposed in a place away from the touch panel, it is difficult to operate the input device while looking at the touch panel, and the operating property becomes remarkably poor. On the other hand, a space positioned just beside the touch panel is a position high in access property for the user, and in which a USB port for connecting thereto a USB memory or a USB cable of an IC card reader. For this reason, when the input device is disposed just beside the touch panel. The access property to the USB port is impaired, and in the case where the input device is connected to the USB port, the USB port is closed. Further, a place where the input device is mounted is ensured, and then when the access property to the USB port is intended to be ensured, the image forming apparatus is upsized. In order to solve this (problem), it would be considered that the external input device is provided with a USB port (JP-A 2002-244795).

Problem to be Solved by the Invention

However, even when the input device described in JP-A 2002-244795 is applied to the image forming apparatus described in the above-described JP-A 2011-118584, the USB port is disposed on a rear side of the input device in a state in which the input device is mounted on the apparatus main assembly. For this reason, when the USB memory or the USB cable of the IC card reader is connected to the USB port provided in the input device, the access property is poor. For example, at an upper portion of the apparatus main assembly of the image forming apparatus, an image reading portion is disposed in many cases, and in this case, there is a possibility that the USB port is closed by the image reading portion. By this, there is a liability that the USB memory or the USB cable of the IC card reader interferes with the image reading portion and cannot be connected to the USB port.

It is an object of the present invention to provide an input device and an image forming apparatus which are capable of suppressing a lowering in access property to the USB port for permitting mounting of the USB memory or the like while mounting the input device for external attachment including the numerical key portion comprised of the hardware key.

Means for Solving the Problem

The input device of the present invention is an input device mountable on an image forming apparatus which includes an image forming portion capable of forming an image and which includes a display portion capable of displaying information, and capable of inputting the information to the image forming apparatus and is provided with a casing, a numerical key portion comprised of hardware keys capable of inputting information on at least numerical values, a connecting portion provided in the casing and for USB-connecting the image forming apparatus and the input device, and a USB port provided in the casing and capable of being USB-connected to external equipment and through which the USB-connected external equipment is capable of being electrically connected to the image forming apparatus via the connecting portion, and the USB port is disposed on a side surface on a front side than the numerical key portion in a state in which the input device is mounted on the image forming apparatus.

Further, the input device of the present invention is an input device mountable on an image forming apparatus which includes an image forming portion capable of forming an image and which includes a display portion capable of displaying information, and capable of inputting the information to the image forming apparatus and is provided with a casing, a numerical key portion comprised of hardware keys capable of inputting information on at least numerical values, a connecting portion provided in the casing and for USB-connecting the image forming apparatus and the input device, and a USB port provided in the casing and capable of being USB-connected to external equipment and through which the USB-connected external equipment is capable of being electrically connected to the image forming apparatus via the connecting portion, and the USB port is disposed on a side surface on a right side than the numerical key portion as seen from a front side in a state in which the input device is mounted on the image forming apparatus.

Further, the image forming apparatus of the present invention includes an image forming portion for forming an image on a recording medium, a display portion capable of displaying information, and the above-described input device.

Effect of the Invention

According to the present invention, it is possible to suppress a lowering in access property to the USB port for permitting mount of the USB memory and the like while mounting the input device for external attachment including the numeric key portion comprised of the hardware keys.

EMBODIMENTS FOR CARRYING OUT THE INVENTION

First Embodiment

Figure 1:
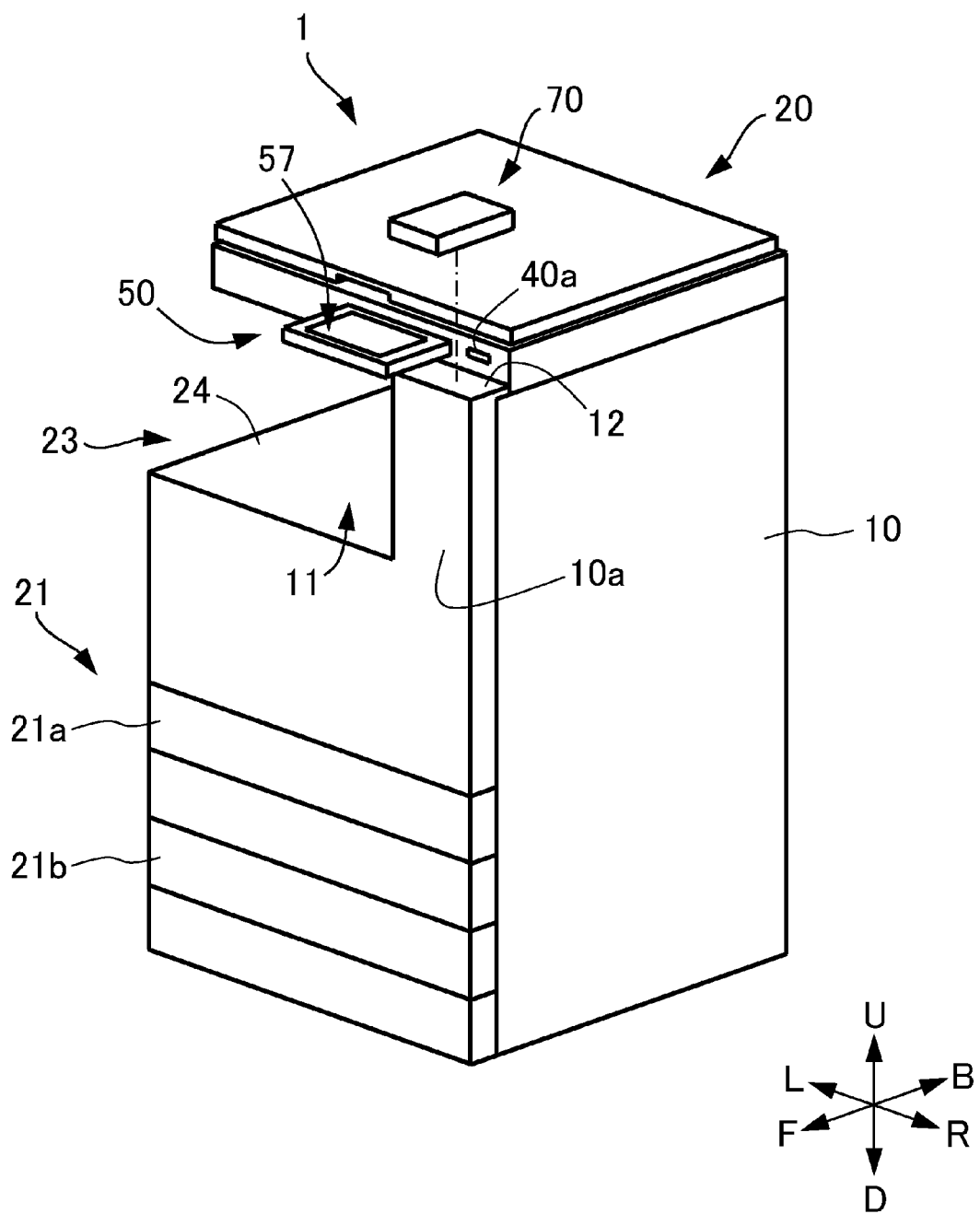
FIG. 1 is a perspective view showing a schematic structure of an image forming apparatus according to a first embodiment.

In the following, a first embodiment of the present invention will be specifically described with reference to FIGS. 1 to 5. Incidentally, in this embodiment, as shown in each of the figures, toward an image forming apparatus 1, a front side is represented by a front side F, a rear side (rear) is represented by a back side B, a left(-hand) side is represented by L, a right(-hand) side is represented by R, an upper (upward) side is represented by U, and a lower (downward) side is represented by D. Further, the image forming apparatus 1 is constituted so that a user is located to face from the front side F toward the back side B and performs various operations. As shown in FIG. 1, in this embodiment, a side where an operating portion 50 described later is provided is the front side F of the image forming apparatus 1.

In this embodiment, as an example of the image forming apparatus 1, a full-color printer of a tandem type is described. However, the present invention is not limited to one mounted on the image forming apparatus 1 of the tandem type but may also be one mounted on an image forming apparatus of another type, and further, the present invention is not limited to one for a full-color image, but may also be one for a monochromatic image or for a mono-color (single color) image. Or, the present invention can be carried out in various uses, such as printers, various printing machines, copying machines, facsimile machines and multi-function machines.

<Image Forming Apparatus>

As shown in FIG. 1, the image forming apparatus of this embodiment includes an image forming apparatus main assembly (hereinafter, referred to as an apparatus main assembly) 10. The apparatus main assembly 10 includes an image reading portion 20, a sheet feeding portion 21, an image forming portion 22 (see FIG. 2), a sheet discharging portion 23, a controller 30 (see FIG. 2) and an operating portion 50. Incidentally, on the sheet as a recording material, a toner image is to be formed, and specific examples of the sheet may include plain paper, a resin-made material sheet as a substitute for the plain paper, thick paper, a sheet for an overhead projector, and the like.

The image reading portion 20 is, for example, a flat head scanner device, and is provided at an upper portion of the apparatus main assembly 10. The image reading portion 20 includes an unshown platen glass as an original mounting table, an unshown light source for irradiating an original, placed on the platen glass, with light, and an unshown image sensor for converting reflected light into a digital signal, and the like member. The sheet feeding portion 21 is disposed at a lower portion of the apparatus main assembly 10, and includes sheet cassettes 21a and 21b for stacking and accommodating the sheet such as recording paper, and feeds the sheet to the image forming portion 22 (see FIG. 2).

The image forming portion 22 is provided inside the apparatus main assembly 10 and includes image forming units each including an unshown developing device and an unshown photosensitive drum as an image bearing member, toner bottles, an intermediary transfer unit, a secondary transfer portion, a fixing device, and the like. The image forming portion 22 is capable of forming an image on the sheet (recording medium) fed from the sheet feeding portion 21, on the basis of image information from a controller 30. The sheet discharging portion 23 includes a discharging tray 24 provided on a side downstream of an unshown discharge opening formed in the apparatus main assembly 10. The discharge tray 24 is a face-down tray, and the sheet discharged through the discharge opening is stacked on the discharge tray 24. Further, a space between the image reading portion 20 and the discharge tray 24 constitutes an in-body space portion 11.

<Controller>

Figure 2:
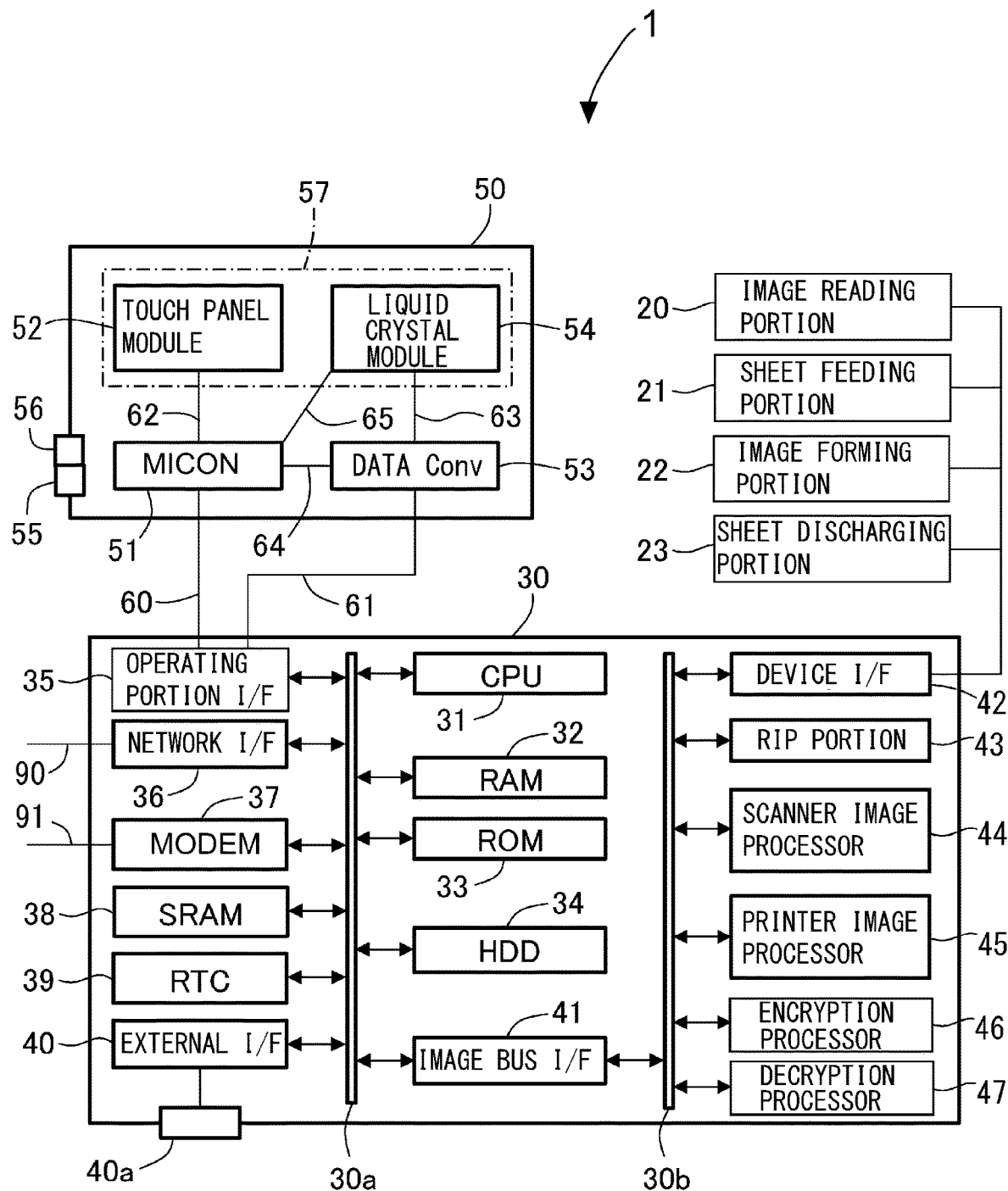
FIG. 2 is a control block diagram of the image forming apparatus according to the first embodiment.

As shown in FIG. 2, the controller 30 is constituted by a computer, and for example, includes a CPU 31, a RAM 32 for temporarily storing data, a ROM 33 for storing a program for controlling respective portions, and an HDD 34. In this embodiment, the controller 30 includes a system bus 30a and an image bus 30b, and each of the CPU 31, the RAM 32, the ROM 33, and the HDD 34 is connected to the system bus 30a. The CPU 31 is a processor for carrying out integrated control of a entirety of the image forming apparatus 1 and is a main body of a system controller. The CPU 31 carries out, for example, image processing of image data for image formation and carries out network control, and in addition, controls image forming processing by outputting an instruction of image formation to the image forming portion 22.

The RAM 32 is a system work memory for operating the CPU 31 and is also an image memory for temporarily storing the image data, and functions as a main memory, a work area, and the like of the CPU 31. In the RAM 32, setting information in the image forming apparatus 1, and a job log and an operation log when respective processes are performed are stored. In the ROM 33, an image formation control sequence or the like for forming an image on a sheet is stored. In this embodiment, the ROM 33 is, for example, a boot ROM and stores a boot program of a system. The HDD 34 is a hard disk drive and stores a system software, an application, the image data, and the like.

The controller 30 includes an operating portion input/output circuit (I/F) 35, a network input/output circuit (I/F) 36, a modem 37, an SRAM 38, an RTC 39, and an external input/output circuit (I/F) 40, which are each connected to the system bus 30b. The operating portion input/output circuit (I/F) 35 not only carries out transmission of the image data to an operating portion 50 described later and various communications from the operating portion 50 but also inputs, to the CPU 31, information inputted from the operating portion 50 by a user.

The network input/output circuit 36 is connected to a network 90 and carries out input/output of the information. Further, the modem 37 is connected to a public line (network) 91 and functions as a facsimile communication portion capable of transmitting and receiving facsimile, and carries out input/output of the information. By this, the controller 30 is capable of communicating with another PC and server, connected thereto, via the network 90 by the network input/output circuit 36 or via the public line 91 by the modem 37 under instruction of the CPU 31. That is, the image forming apparatus 1 is connected to the network 90 or the public line 91, and carries out input/output of image information and device information.

The SRAM 38 is a nonvolatile storing medium capable of high-speed operation. The RTC 39 is a real time clock, and performs processing in which a current time is continuously counted even in a state in which power is not supplied to the controller 30. The external input/output circuit 40 is a general-purpose input/output circuit such as Universal Serial bus (hereinafter referred to as USB) and connects a general-purpose PC, a memory device, and a numeric key unit 70 described later via a USB port 40a. Incidentally, the USB port 40a is provided, in this embodiment, on a side surface 10F of the front side F positioned on the back (rear) side B of an installation surface 12 (see FIG. 1), described later, for installation of the numeric key unit 70.

The controller 30 includes an image bus input/output circuit (I/F) 41. The image bus input/output (I/F) 41 is a bus bridge which connects the system bus 30a and the image bus 30b transferring the image data at high speed and which converts a data structure. The image bus 30b is constituted by, for example, a PCI bus or an IEEE 1394.

The controller 30 includes a device input/output circuit (I/F) 42, a RIP portion 43, a scanner image processing portion 44, an printer image processing portion 45, an encryption processing portion 46, and a decryption processing portion 47, which are each connected to the image bus 30b. The device input/output circuit 42 connects the image reading portion 20 and the image forming portion 22 to the controller 30 and performs a synchronous line and a non-synchronous line of the image data. The RIP portion 43 is a raster image processor and develops PDL data into a bit-mapped image. The scanner image processing portion 44 performs correction, processing and editing of the image data. The printer image processing portion 45 subjects print output image data to printer correction, resolution conversion, and the like. The encryption to processing portion 46 subjects input data including the image data to encryption processing. The description processing portion 47 subjects encrypted data to description processing.

<Operating Portion>

Next, an example of a hardware constitution for controlling respective pieces of software of the operating portion (display portion) 50 will be described. The operating portion 50 includes a micon 51, a touch panel module 52, a data converter (Cony) 53, and a liquid crystal module 54. The operating portion 50 is connected to the controller 30 by a serial bus 60 for establishing communication with the CPU 31 and by a bus 61 for transferring data for being displayed on the liquid crystal module 54.

The micon 51 is a microcomputer for carrying out integrated control of entirety of the operating portion 50. Inside the micon 51, a ROM in which a program for operating the micon 51 is stored is mounted. The touch panel module 52 is disposed on a surface of the liquid crystal module 54, and by user's touch, the touch panel module 52 notifies the micon 51 of positional information of a touched portion via a touch panel communication bus 62. The operating portion 50 is capable of causing the liquid crystal module 54 to display software keys and the user is capable of inputting information by contact with the touch panel module 52. The touch panel module 52 is constituted by a touch panel device and a touch panel device controller. As a touch panel device, those of any types such as a resistive film type, an electrostatic capacity type, and an optical type of infrared radiation or the like may also be applied.

The data converter 53 is a module which receives the image data from the operating portion IN/output circuit 35 of the controller 30 via the bus 61 and which then converts the image data into data format which is capable of being received by the liquid crystal module 54. For example, the data converter 53 receives data of standards such as Display Port and HDMI (registered trademark) from the controller 30 and converts the data into LVDS and signal format of a CMOS level which are capable of being received by the liquid crystal module 54, and then inputs the converted data to the liquid crystal module 54 via a bus 63. Further, the data converter 53 is connected to the micon 51 by a bus 64, and also has a function of overwriting the image data sent from the controller 30 with the image data generated by the micon 51 at a predetermined position.

The liquid crystal module 54 is a module constituted by an LCD and a backlight module, and receives data from the data converter 53 via the bus 63 and then transfers the image data to the LCD at a timing determined in advance. At this time, by causing the backlight module to emit light, the image data transferred to the LCD is displayed as a visible image. Adjustment of brightness of the back light is performed by operating switches 55 and 56 dedicated for brightness adjustment accompanying the operating portion 50.

When the switch 55 is pressed down one time by the user, the micon 51 sends a command of setting for brightening the brightness by one level toward the book light module in the liquid crystal module 54 via a bus 65. The back light module receiving the command, from the micon 51, for brightening the brightness by one level increases a value of a current corresponding to an amount determined in advance and then supplies the current to the LED device in the back light.

When the switch 56 is pressed down one time by the user, the micon 51 sends a command of setting for darkening the brightness by one level toward the back light module in the liquid crystal module 54 via the bus 65. The back light module receiving the command, from the micon 51, for darkening the brightness by one level decreases a value, of a current corresponding to an amount determined in advance, from a value of a current supplied at present, and then supplies the current to the LED device in the back light.

As shown in FIG. 1, the operating portion 50 is provided on a front side F than a central portion of the image forming apparatus 1 with respect to a front-rear direction and is provided above a front cover 10a which is a part of an outer casing cover of the apparatus main assembly 10. The operating portion 50 is formed in, for example, a rectangular flat plate shape, and is fixedly provided to the apparatus main assembly 10 with a panel surface 57, toward an upper side U, constituted by laminating the touch panel module 52 on the liquid crystal module 54 (see FIG. 2). The software keys displayed on the panel surface 57 are input keys for detecting input of the keys by touch operation of respective display portions. Incidentally, the shape of the operating portion 50 is not limited to the rectangular flat plate shape, but may also be another shape. Further, a direction of the touch panel module 52 and the liquid crystal module 54 is not limited to the upper side U, but may also be another direction, and for example, these modules may also be provided so as to be tiltable in an up-down direction relative to the apparatus main assembly 10 and so that the direction of the touch panel module 52 and the liquid crystal module 54 is changeable.

On the right side R of the operating portion 50, the installation surface 12 facing the upper side U on the right side R of the front side F of the apparatus main assembly 10 adjacent to the operating portion 50 is provided. On the installation surface 12, the numerical key unit 70 is capable of being installed, and by installation, the numerical key unit 70 is disposed adjacent to and on the right side R of the operating portion 50 as viewed from the front side in a state in which the casing 70a is mounted on the apparatus main assembly 10. On the side surface 10F of the front side F of an outer casing of the apparatus main assembly 10 positioned on the back side B of the installation surface 12, the USB port 40a is provided, so that the user is capable of realizing USB connection by mounting external equipment (device) having a USB terminal such as a USB memory.

<Numerical Key (Ten Key) Unit>

Figure 3:
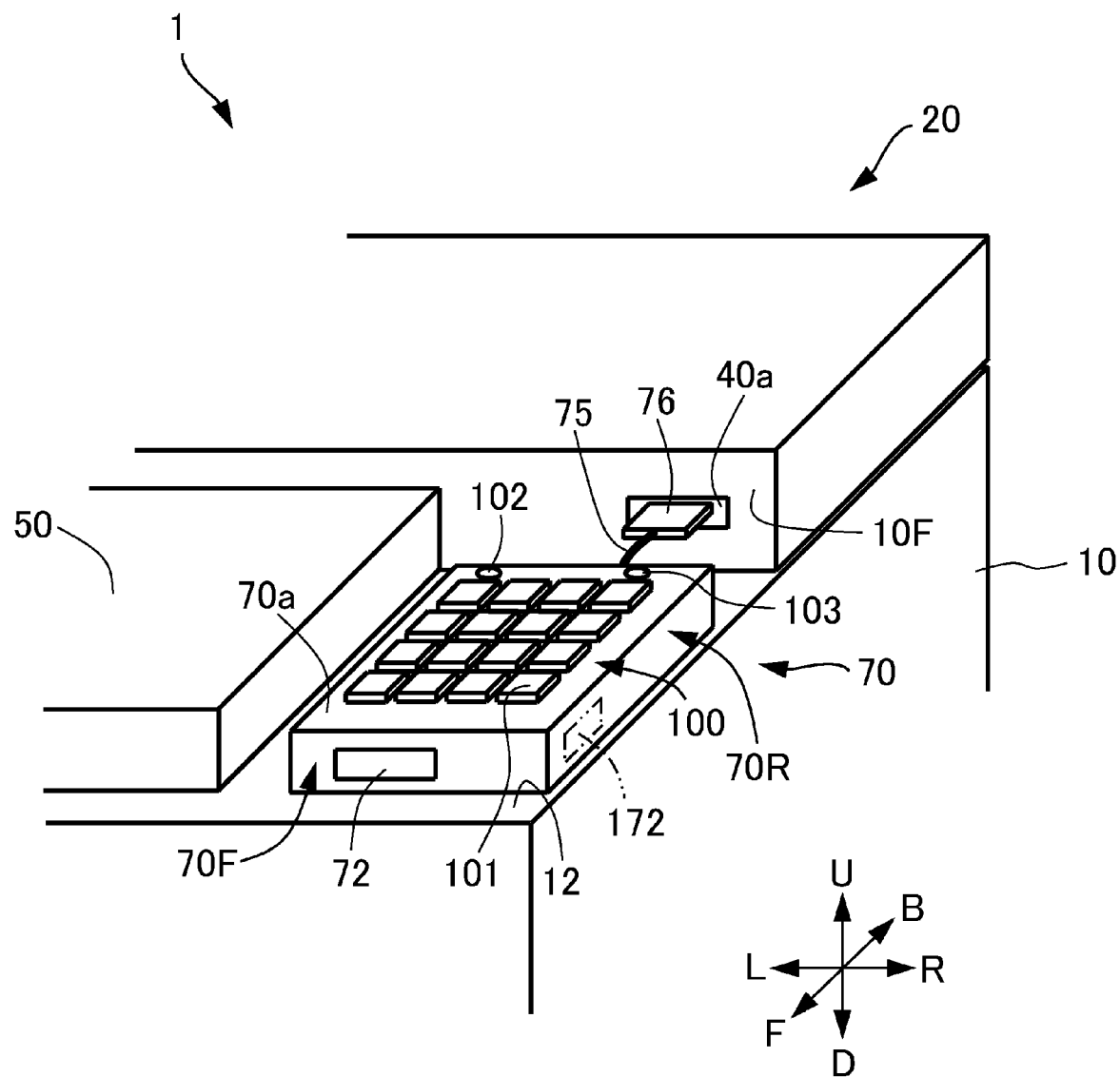
FIG. 3 is a perspective view showing a numerical key unit of the image forming apparatus according to the first embodiment.

Next, a hardware constitution and an operation of the numeric key unit 70 which is an input device connected to the image forming apparatus 1 will be described. As shown in FIG. 3, the numerical key unit 70 is provided so as to be adjacent to the operating portion 50 on the right side. This numeric key unit 70 is mountable to the image forming apparatus 1 including the operating portion 50 capable of inputting information, and is capable of inputting information to the image forming apparatus 1 separately from the operating portion 50. As an example of different uses for different purposes in information input between the operating portion 50 and the numeric key unit 70, setting of a density, a size, and the like relating to image formation is inputted from the operating portion 50, and numerical values such as the number of image-formed sheets and a designation number of a facsimile are inputted from the numeric key unit 70. Incidentally, in the present specification, the numerical key is a concept including either of the case where the numerical key shows 10 numerical keys from 0 to 9, the case where the numerical key shows 12 keys in which "*" and "#" are added to the (10) numerical keys, and the case where the numerical key shows about 20 keys in which numerical keys include four arithmetic operators, a "NumLock", and the like.

The numerical key unit 70 includes the casing 70a, operating keys (numerical value key portion) 100 provided on an upper surface of the casing 70a, LED windows 102 and 103, a connecting cable (connecting portion) 75, and an external USB port (USB port) 72. The casing 70a is fixed to the installation surface 12 (see FIG. 1) of the image forming apparatus 1 by, for example, screwing, a fixing member such as an adhesive tape, or bonding. By this, the user can use the numerical key unit 70 easily by utilizing his (her) right hand while looking at the operating portion 50.

The external USB port 72 is disposed on a side surface 70F of the front side F than the operating keys 100 in a state in which the casing 70a is mounted on the installation surface 12 of the apparatus main assembly 10. The external USB port 72 is USB-connectable to the external equipment, and the USB-connected external equipment is USB-connected to the apparatus main assembly 10 via the connecting cable 75. An installation position of the external USB port 72 will be described later. The connecting cable 75 is a USB cable provided from the casing 70a toward an outside, and at a free end thereof, a USB connector 76 is provided. The USB connector 76 is connected to the USB port 40a. That is, the connecting cable 75 is USB-connected to the image forming apparatus 1, and the controller 30 of the image forming apparatus 1 and the numerical key unit 70 are electrically connected to each other via the connecting cable 75. That is, the external equipment connected to the external USB port 72 is constituted so that various signals are capable of being outputted to the controller 30 of the image forming apparatus 1 via the operating cable 75.

The operating keys 100 are hardware key tops and are arranged in 4 column×4 rows, i.e., 16 keys in this embodiment. The operating keys 100 have, for example, a key arrangement of a telephone type (details thereof will be described later) including the above-described numerical keys of 0 to 9 and the keys of "*" and "#", or a key arrangement of an electronic calculator type (details thereof will be described later) including the numerical keys of 0 to 9, the four arithmetic operator keys, and the "NumLock" key. The LED windows 102 and 103 are disposed, for example, on the back side B of the operating keys 100, and are provided so that lighting states of LEDs 77 and 78 provided inside the LED windows 102 and 103, respectively, are capable of being recognized. Incidentally, the number of the hardware keys of the operating keys 100 is 16 (keys), and the number of the LEDs 77 and 78 is two, but are not limited thereto. Further, the arrangements of the operating keys 100 and the LEDs 77 and 78 are not limited to those in this embodiment.

Figure 4:
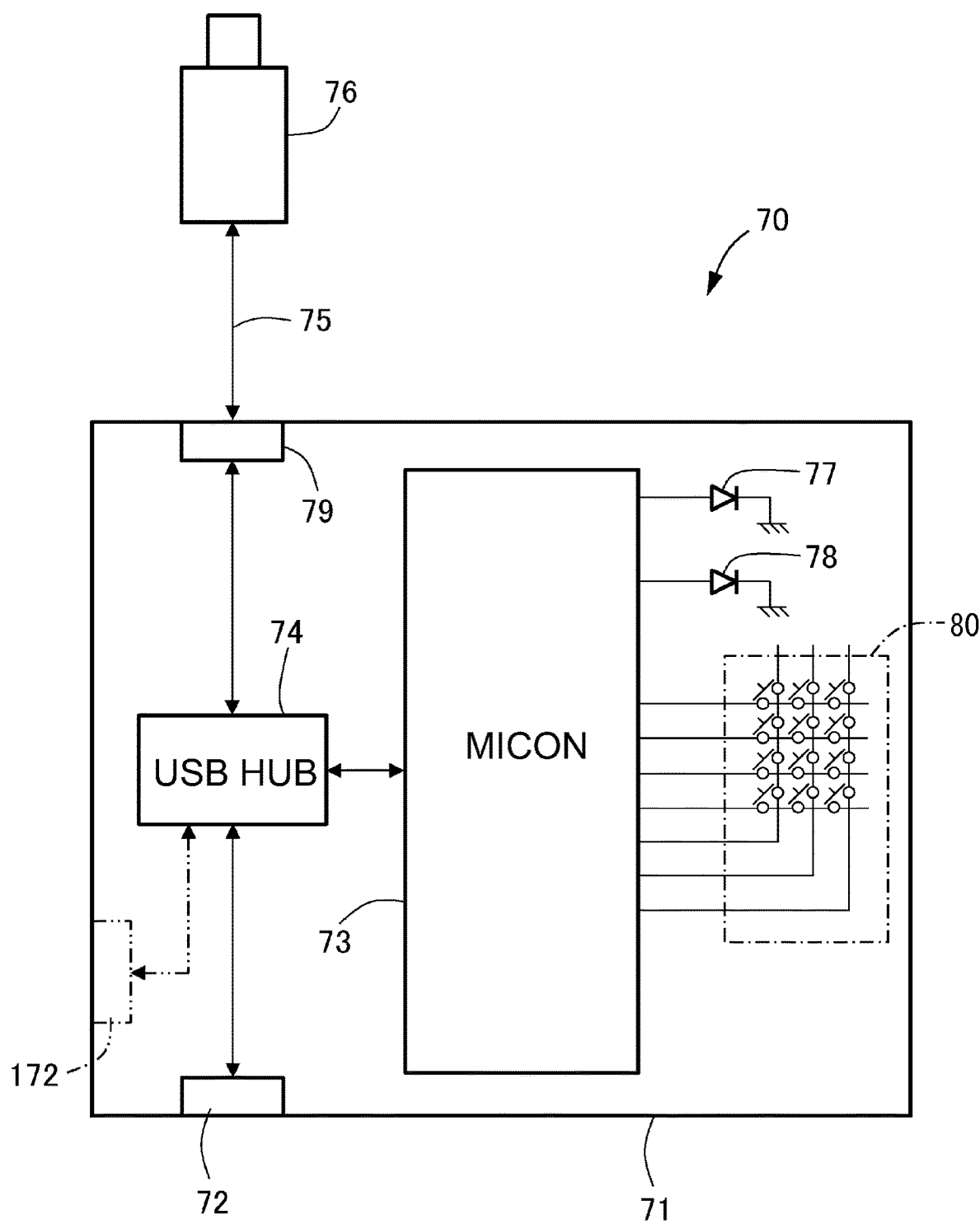
FIG. 4 is a control block diagram of the numerical key unit of the image forming apparatus according to the first embodiment.
Figure 5:
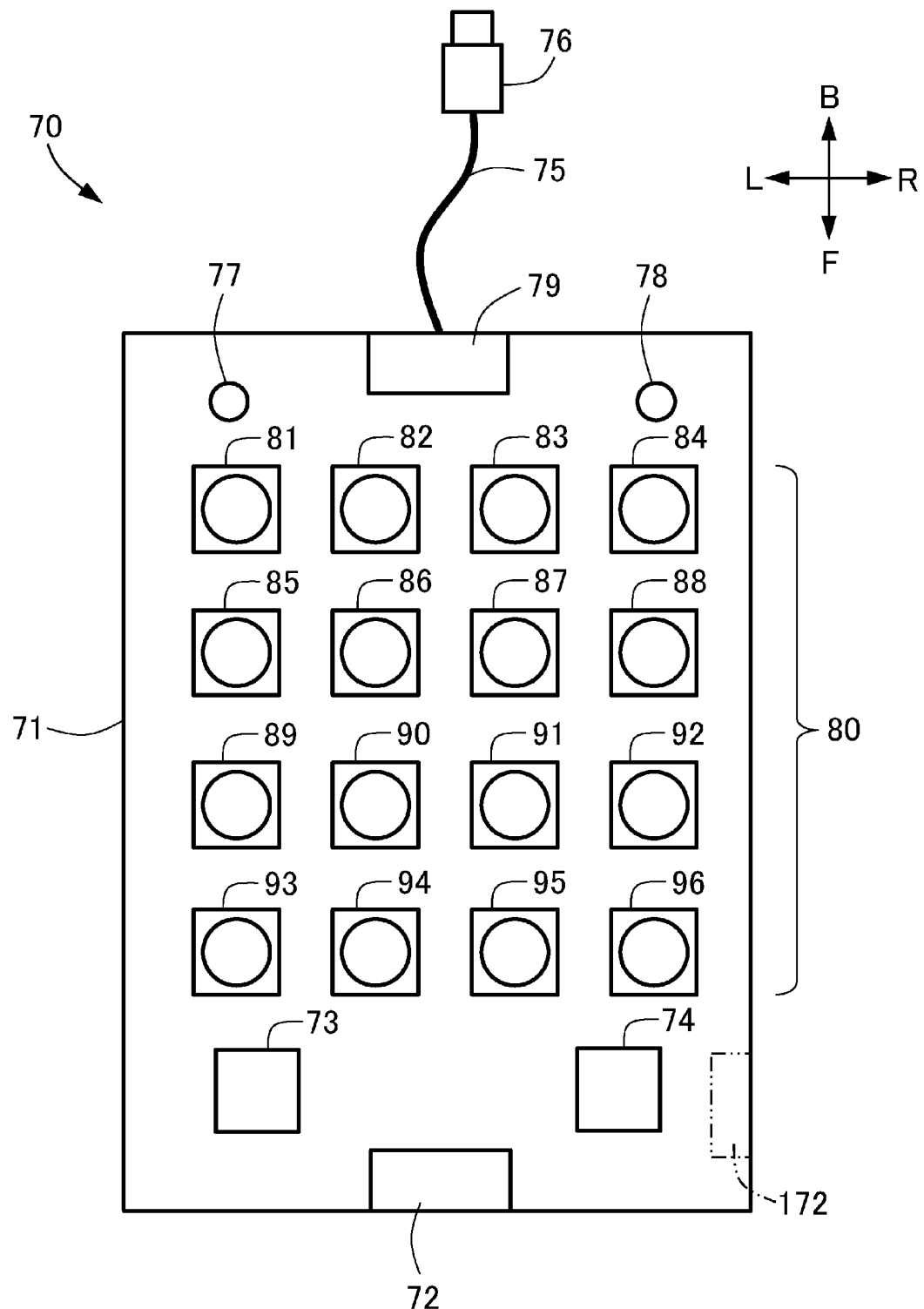
FIG. 5 is a (top) plan view of a substrate of the numerical key unit of the image forming apparatus according to first embodiment.

As shown in FIG. 4 and FIG. 5, the numerical key unit 70 includes a substrate 71, and the substrate 71 is provided with a hardware key unit 80, a micon 73, the LEDs 77 and 78, a USB hub 74, a substrate connector 79, and the external USB port 72. The LEDs 77 and 78 are capable of emitting light by a signal from the controller 30 of the apparatus main assembly 10.

The hardware key unit 80 includes a plurality of hardware keys capable of inputting by being pushed down. In this embodiment, in order to provide operation feeding (for example, click feeling) of the operation keys 100 (see FIG. 3) to the user, as an example of the numerical keys, tactile switches 81 to 96 are supplied. The tactile switches 81 to 96 are disposed, for example in a matrix form, one by one at positions opposing the operation keys 100, respectively, on an inside of the casing 70a, and are connected to the micon 73. Each of the tactile switches 81 to 96 is constituted by, for example, a protective cover, a plunger pushed by the operation key 100, a reversing spring not only creating the click feeling but also functioning as a movable contact, and a base portion including two contacts. Incidentally, as the tactile switches 81 to 96, an existing or new appropriate constitution can be applied, and thus will be omitted from detailed description.

The micon (control means) 73 is capable of executing, for example, detection of input from the numerical key unit 80, and lighting control of the plurality of LEDs 77 and 78. The USB connector 76 is connected to the USB port 40*a* (see FIG. 2) which is the USB connector of the external input/output circuit 40 of the apparatus main assembly 10. By this, the micon 73 and the controller 30 are USB-connected to each other via the connecting cable 75, and thus are capable of communicating with each other through an HID protocol for USB. That is, the connecting cable 75 is USB-connected from the casing 70*a* to the apparatus main assembly 10, and the micon 73 is, for example, connected to the USB connector 76 via the USB hub 74 and is capable of executing USB communication with the CPU 31 of the image forming apparatus 1 via the external input/output circuit 40. That is, the micon 73 is constituted so as to be capable of outputting various signals to the controller 30 of the image forming apparatus 1 via the operation cable 75 in response to an operation of the numerical keys 100 or the like.

The micon 73 specified the tactile switches 81 to 96 pushed down and generates a code determined in advance in the case where the tactile switches 81 to 96 is pushed down by the user. The micon 73 sends the generated key code to the CPU 31 of the image forming apparatus 1 via the connecting cable 75. The CPU 31 performs processing depending on the key inputted.

The LEDs 77 and 78 are subjected to lighting control by the micon 73. In this embodiment, the LEDs 77 and 78 are, for example, an LED indicating a power supply state and an LED indicating a malfunction of the numerical key unit 70 or improper communication with the apparatus main assembly 10. However, uses the LEDs 77 and 78 are not limited thereto, but the LEDs 77 and 78 may also be an LED indicating, for example, a state in which an image forming process is enabled and an LED indicating, for example, a state of a mode such as a voice input mode. The USB hub 74 is not only connected to the micon 73 and the external USB port 72 but also connected to the connecting cable 75 via the substrate connector 79. The substrate connector 79 is disposed on the substrate 71 of the numerical key unit 70, and to the substrate connector 79, a base terminal side of the connecting cable 75 is connected.

Incidentally, in this embodiment, the connecting cable 75 has a constitution in which the connecting cable 75 is connected to the substrate connector 79 and cannot be dismounted from the numerical key unit 70. However, a mounting structure of the connecting cable 75 into the numerical key unit 70 is not limited thereto, for example, the numerical key unit 70 is provided with a USB port connected to the USB hub 74 and to this USB port, the USB cable may also be connected so as to be mountable and dismountable. Or, the USB cable is provided from the image forming apparatus 1 side, and a terminal of this USB cable may also be connected mountably in and dismountably from the USB port connected to the USB hub 74 of the numerical key unit 70.

As shown in FIG. 5, on the substrate 71, in a state in which the numerical key unit 70 is mounted on the apparatus main assembly 10, the micon 73 and the USB hub 74 are disposed on the front side F than the numerical key unit 80. Further, with respect to a left-right direction, between the micon 73 and the USB hub 74, the external USB port 72 is disposed in an orientation such that the external USB port 72 opens toward the front side F. The external USB port 72 has a large occupied area on the substrate 71, and therefore, is arranged and disposed between the micon 73 and the USB hub 74, so that downsizing of the numerical key unit 70 can be realized. However, although the case where the external USB port 72 is disposed between the micon 73 and the USB hub 74 was described, the arrangement of the external USB port 72 is not limited thereto.

Here, when the external USB port 72 is disposed on a side surface of the back side B of the numerical key unit 70, an access property becomes poor when the USB memory or the USB cable of the IC card reader is connected to this external USB port 72. Particularly, in this embodiment, the image reading portion 20 is disposed at an upper portion of the apparatus main assembly 10, so that there is a possibility that the external USB port 72 is closed (blocked) by the image reading portion 20. Under such circumstances, there is a liability that the USB memory and the USB cable of the IC card reader which are intended to be inserted into the external USB port 72 interfere with the image reading portion 20 and thus cannot be connected to the external USB port 72.

On the other hand, in this embodiment, in the case where the operating keys 100 of the numerical key unit 70 are viewed from the front side, the external USB port 72 is disposed on the side surface 70F of the numerical key unit 70 on the front side F. For this reason, the external USB port 72 does not interfere with another constitution member such as the image reading portion 20, so that the USB memory and the USB cable of the IC card reader can be connected to the external USB port 72. Here, the top side view (position) of the operating keys 100 is a position where numerical values provided for the hardware keys of a numerical key unit 170 are properly viewed in the up-down direction and is a position when the numerical key unit 70 is viewed from a direction parallel to a pressing (urging) direction of the operating keys 100.

As described above, according to the image forming apparatus 1 of this embodiment, the external USB port 72 is disposed on the side surface 70F of the numerical key unit 70 on the front side F, so that the external USB port 72 is provided so that the user has access thereto from the front side F of the apparatus main assembly 10. For this reason, a lowering in access property to the external USB port 72 for permitting mounting of the USB memory or the like can be suppressed even while mounting the numerical key unit 70 for external attachment including the operating keys 100 comprised of the hardware keys.

Incidentally, in the above-described embodiment, the case where the external USB port 72 is disposed on the side surface 70F of the front side F than the operating keys 100 in the numerical key unit 70 was described, but the present invention is not limited thereto. For example, as shown in FIG. 3 by a phantom line, in the case where the operating keys 100 are viewed from the front side, an external USB port 172 may also be disposed on a side surface 70R of the right side R than the operating keys 100. That is, the USB port 172 is disposed on the side surface 70R of the right side R than the operating keys 100 as viewed from the front side in a state in which the casing 70A is mounted on the apparatus main assembly 10. Also, in this case, it is possible to ensure an access property to the external USB port 172 for permitting mounting of the USB memory or the like even while mounting the numerical key unit 70 for external attachment including the operating keys 100 comprised of the hardware keys. Further, in this case, USB connection can be realized on the right side R of the numerical key unit 70, so that for example, in the case where the IC card reader is provided on the right side R of the numerical key unit 70, the USB connector of the IC card reader can be easily connected to the external USB port 172. Further, also, in the case where the USB memory or a general-purpose full keyboard is connected to the right side R of the numerical key unit 70, connection can be realized without impairing the numerical key unit 70. Incidentally, for example, in the case where it is difficult to realize the USB connection to the right side R of the numerical key unit 70, such as the case where a wall exists on the right side R of the numerical key unit 70, the USB connection may preferably be made on the front side of the numerical key unit 70.

Further, the external USB port 72 is not limited to that which is disposed on either the side surface 70F of the front side F or the side surface 70R of the right side R in the numerical key unit 70, but may also be disposed on both the side surfaces 70F and 70R. In this case, the numerical key unit 70 includes the external USB port 72 and another external USB port (another USB port) 172 which are connected to the apparatus main assembly 10 via the connecting cables 75. Another USB port 72 is disposed on the side surface 70R of the right side R than the operating keys 100 as viewed from the front side in the state in which the casing 70a is mounted on the apparatus main assembly 10. Each of the USB ports 72 and 172 is connected to the USB hub 74 as shown in FIG. 4.

Second Embodiment

Figure 6:
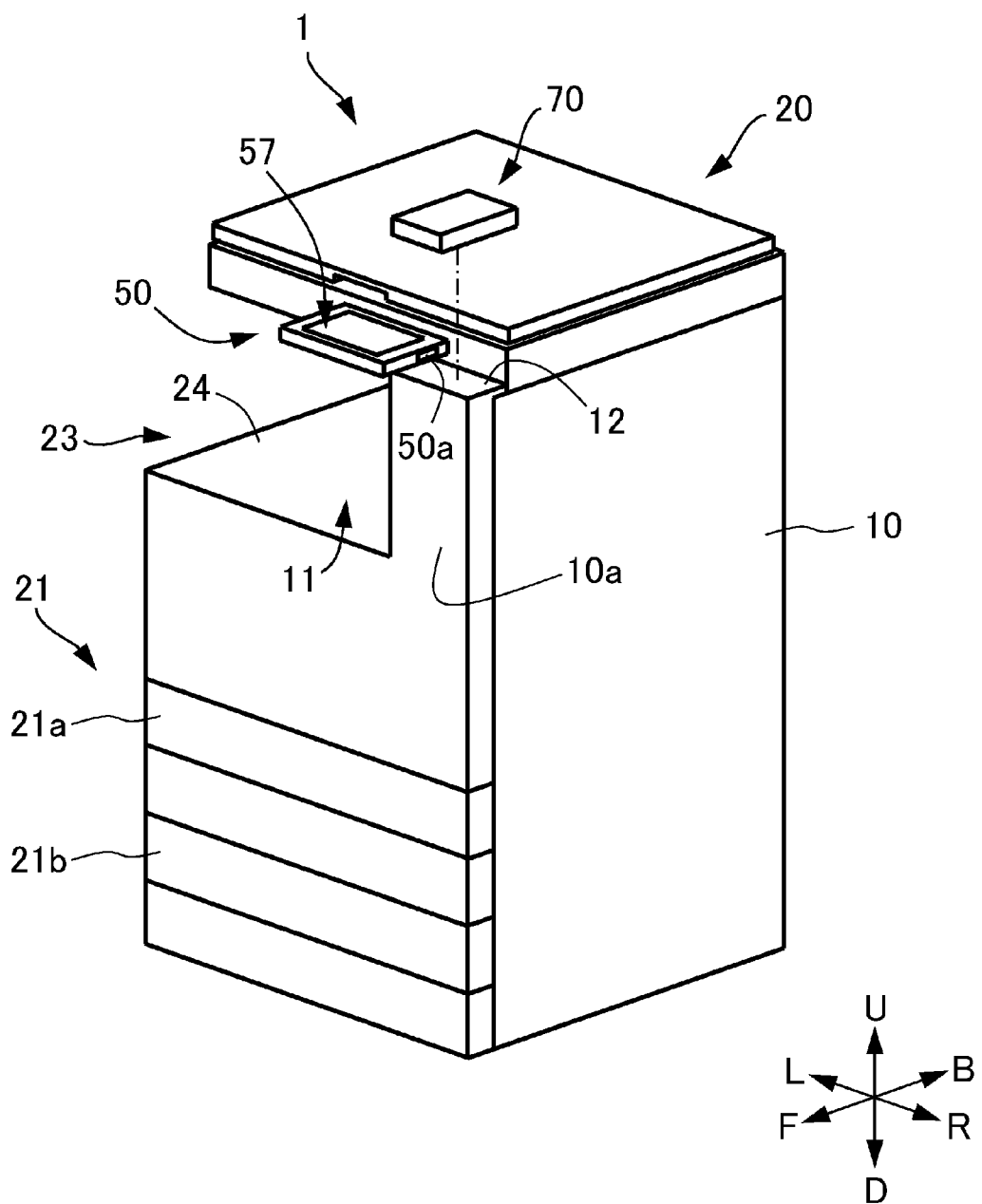
FIG. 6 is a perspective view showing a schematic structure of an image forming apparatus according to a second embodiment.
Figure 7:
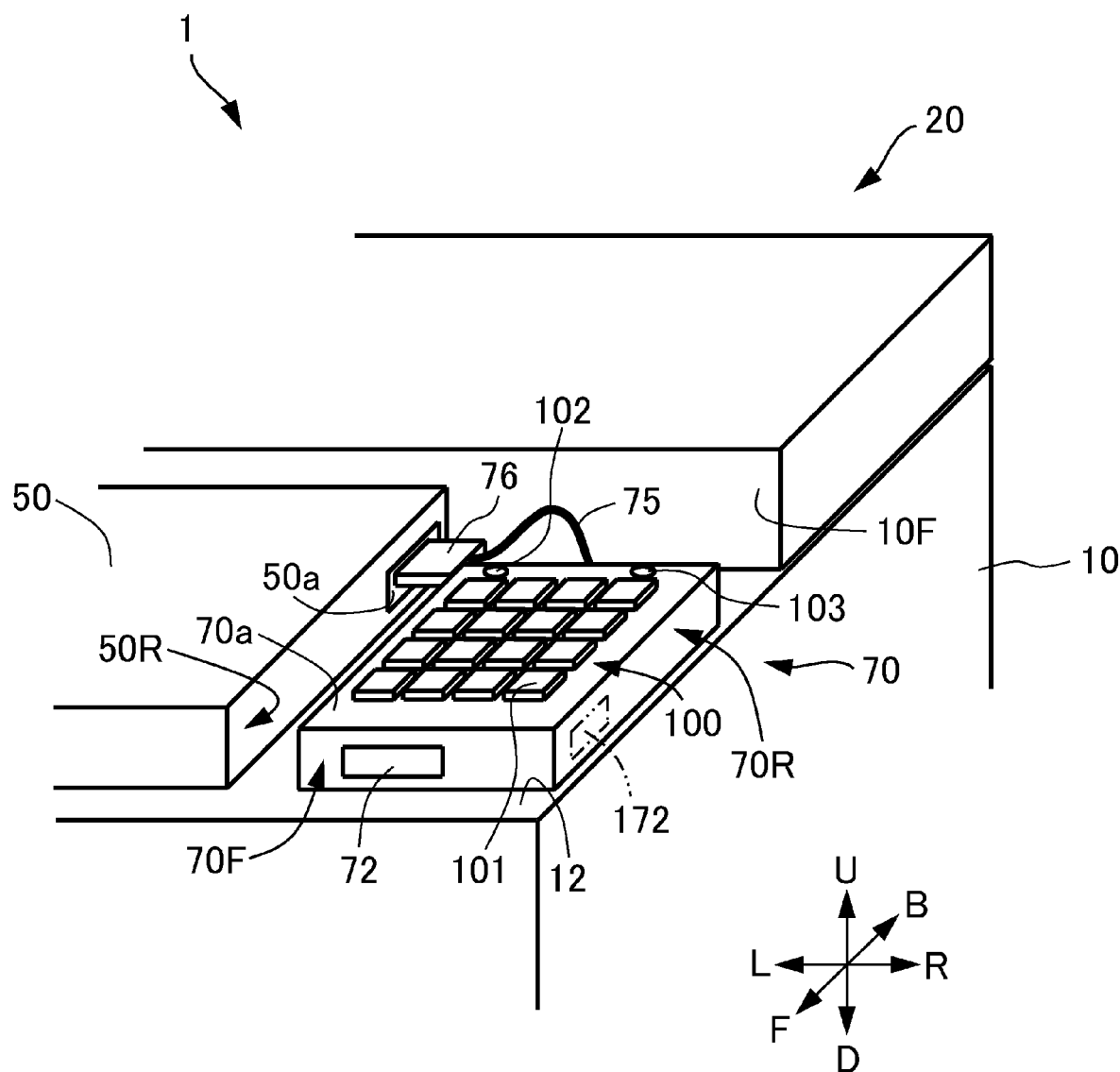
FIG. 7 is a perspective view showing a numerical key unit of the image forming apparatus according to the second embodiment.

Next, a second embodiment of the present invention will be specifically described while making reference to FIG. 6 and FIG. 7. In this embodiment, a constitution is different in that a USB port 50a on the apparatus main assembly side is provided on a side surface 50R of the right side R of the operating portion 50 disposed adjacent to the left side L of the numerical key unit 70, from the constitution of the first embodiment in which the USB port is provided on the back side B of the installation surface 12 of the apparatus main assembly 10. However, other constitutions are similar to those in the first embodiment, and the same reference numerals or symbols are used and detailed description will be omitted.

In this embodiment, the USB port 50a on the apparatus main assembly side is not only provided on the side surface 50R of the operating portion 50 on the right side R but also connected to an unshown CPU of the operating portion 50. For this reason, the micon 73 (see FIG. 4) of the numerical key unit 70 is connected to the CPU of the operating portion 50 and is connected to the controller 30 of the apparatus main assembly 10 via the CPU of the operating portion 50.

Also, by this embodiment, the external USB port 72 is disposed on the side surface 70F of the numerical key unit 70 on the front side F, so that the external USB port 72 is provided so that the user has access thereto from the front side F of the apparatus main assembly 10. That is, the external USB port 72 is disposed on the front side F than the operating keys 100 in the case where the start keys 100 are viewed from the front side. For this reason, a lowering in access property to the external USB port 72 for permitting mounting of the USB memory or the like can be suppressed even while mounting the numerical key unit 70 for external attachment including the operating keys 100 comprised of the hardware keys.

Incidentally, in the above-described embodiment, the case where the external USB port 72 is disposed on the side surface 70F of the front side F than the operating keys 100 in the numerical key unit 70 was described, but the present invention is not limited thereto. For example, as shown in FIG. 7 by a phantom line, an external USB port 172 may also be disposed on a side surface 70R of the right side R than the operating keys 100. That is, the external USB port 72 may also have a constitution in which the external USB port 72 is disposed on the right side R than the operating keys 100 in the case where the operating keys 100 are viewed from the front side. Also, in this case, it is possible to ensure an access property to the external USB port 172 for permitting mounting of the USB memory or the like even while mounting the numerical key unit 70 for external attachment including the operating keys 100 comprised of the hardware keys.

Third Embodiment

Figure 8:
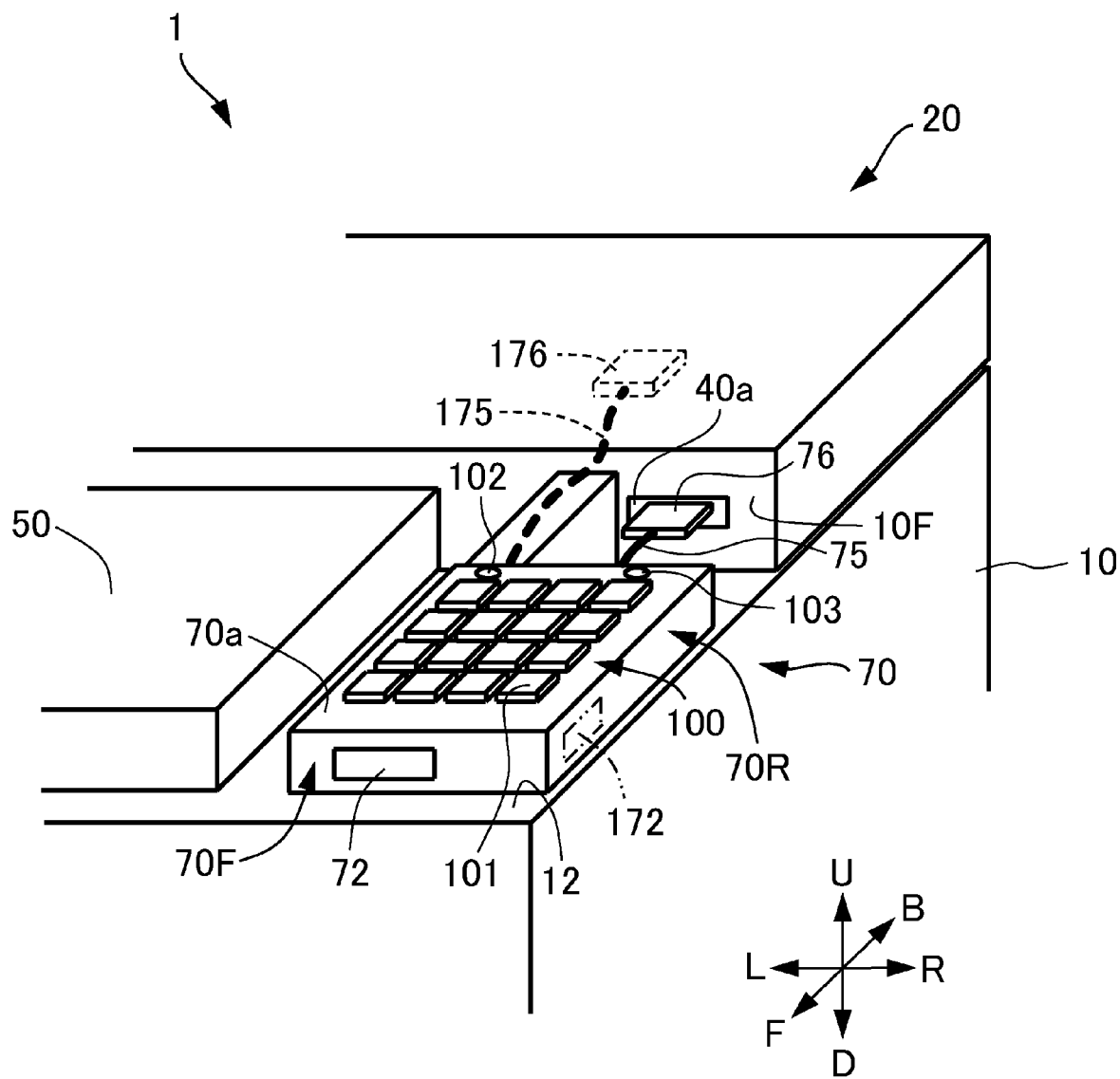
FIG. 8 is a perspective view showing a numerical key unit of an image forming apparatus according to a third embodiment.
Figure 9:
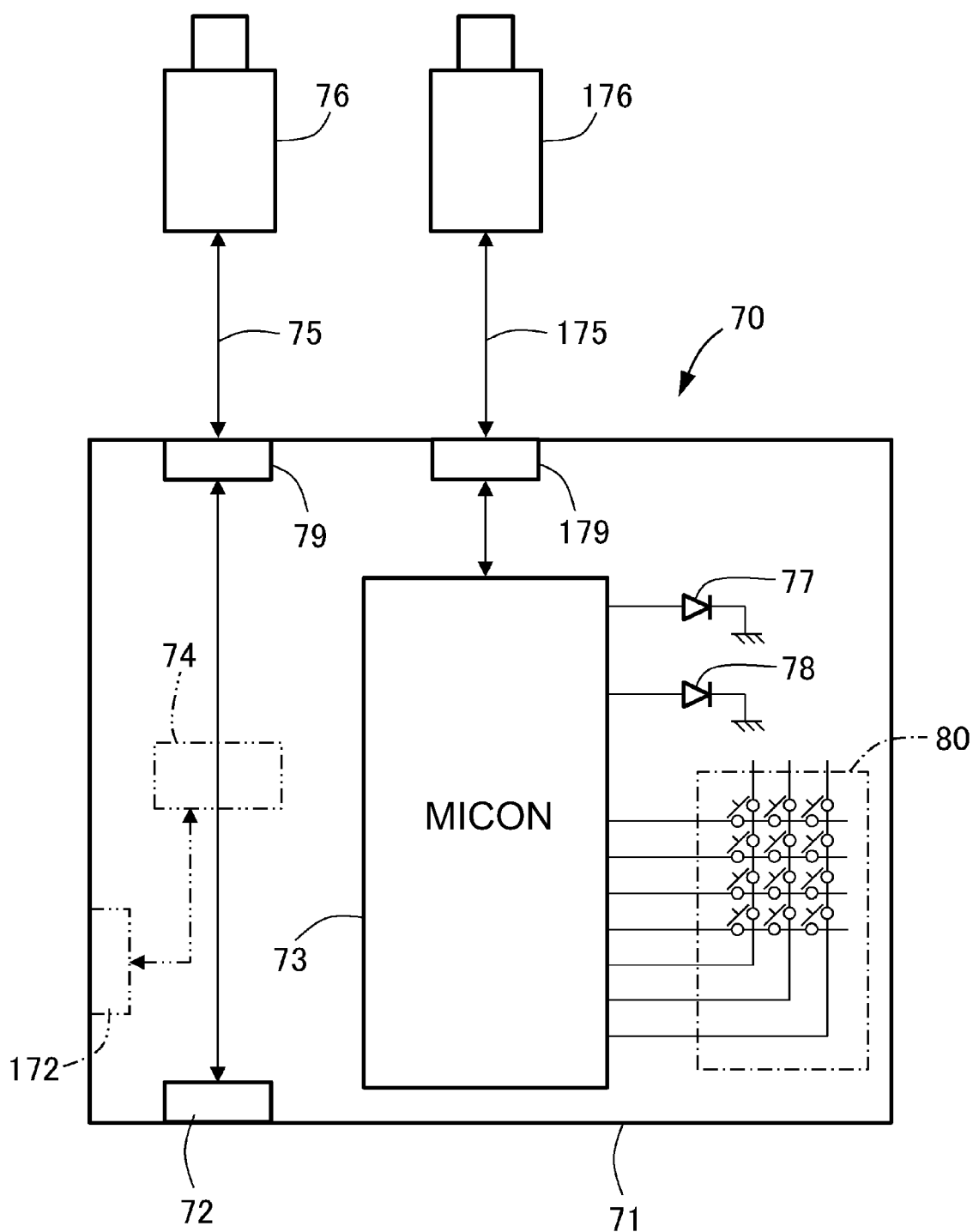
FIG. 9 is a control block diagram of the numerical key unit of the image forming apparatus according to the third embodiment.

Next, a third embodiment of the present invention will be specifically described while making reference to FIG. 8 and FIG. 9. In this embodiment, a constitution is different in that the micon 73 is connected to the controller 30 by communication of a communication standard different from a USB standard, from the constitution of the first embodiment in which the micon 73 is connected to the controller 30 by the USB standard. However, other constitutions are similar to those in the first embodiment, and the same reference numerals or symbols are used and detailed description will be omitted.

In this embodiment, on the substrate 71 of the numerical key unit 70, the micon 73, a first substrate connector 79, the external USB port 72, and a second substrate connector 179 are provided. To the first substrate connector 79, a base terminal side of the connecting cable 75 is connected, and a free terminal of the connecting cable 75 is provided with a USB connector 76. In this embodiment, the connecting cable 75 and the USB port 72 are directly connected to each other inside the casing 70a, so that communication by the USB standard can be executed. Further, as described in the first embodiment, the USB connector 76 is electrically connected to the controller 30 of the image forming apparatus 1, and therefore, the external equipment connected to the external USB port is communicatably connected to the controller 30 via the connecting cable 75.

The second substrate connector 179 is connected to the micon 73. Further, to the second substrate connector 179, a base terminal side of a connecting cable (communication portion) 175 is connected, and a free terminal of the connecting cable 175 is provided with a connector 176. This connector 176 has a connector shape different from a connector of the USB standard, and from the micon 73 toward the controller 30 of the image forming apparatus 1, serial bus communication slow in transmission speed is used. In this embodiment, for example, as communication of the communication standard different from the USB standard connecting the micon 73 with the controller 30, VART or SPI is used. The connector 176 is connected to an unshown port of the external input/output circuit 40 (see FIG. 2) of the controller 30. By this, the micon 73 is connected to the controller 30 via the connecting cable 175. Here, the connecting cable 145, the connecter 176, and the second substrate connector 179 are an example of the communication portion and is an example of the connecting portion.

As shown in FIG. 8, the USB connector 76 of the numerical key unit 70 is inserted into the USB port 40a provided on the back surface B of the installation surface 12. Further, the connector 176 passes through an inside of the apparatus main assembly 10 and is connected to an unshown control substrate or an unshown connector coming out of the control substrate. In this embodiment, the external USB port 72 of the numerical key unit 70 is disposed on the side surface 70F of the numerical key unit 70 on the front side, but may also be disposed on the side surface 70R of the right side R. That is, the external USB port 72 may also be disposed on the front side F than the operating keys 100 and may also be disposed on the right side R than the operating keys 100 in the case where the operating keys 100 are viewed from the front side.

Also, by this embodiment, the external USB port 72 is disposed on the side surface 70F of the numerical key unit 70 on the front side F, so that the external USB port 72 is provided so that the user has access thereto from the front side F of the apparatus main assembly 10. For this reason, a lowering in access property to the external USB port 72 for permitting mounting of the USB memory or the like can be suppressed even while mounting the numerical key unit 70 for external attachment including the operating keys 100 comprised of the hardware keys.

Incidentally, in the above-described embodiment, the case where a circuit from the first substrate connector 79 to the external USB port 72 and a circuit from the second substrate connector 179 to the micon 73 and the hardware key unit 80 are provided on the same substrate 71 was described. However, the present invention is not limited thereto, and for example, the both circuits described above may also be provided on separate substrates.

Further, in the above-described embodiment, the case where the external USB port 72 is directly connected to the first substrate connector 79 was described, but the present invention is not limited thereto, and for example, the external USB port 72 may also be connected via the USB hub 74. That is, the to USB hub 74 is connected to each of the connecting cable 75 and the external USB port 72. In this case, the USB hub 74 may also be provided with another external USB port 172. Another external USB port 172 may also be disposed on the side surface 70R of the right side R than the operating keys 100 as shown in FIG. 8 by a phantom line.

Further, in the above-described embodiment, the case where the micon 73 is connected to the controller 30 via the USB port 40a provided on the back side B of the installation surface 12 was described, but the present invention is not limited thereto. For example, the micon 73 may also be connected to the controller 30 via the USB port 50a (see FIG. 7) provided on the side surface 50R of the operating portion 50 on the right side R and the CPU of the operating portion 50.

Fourth Embodiment

Figure 10:
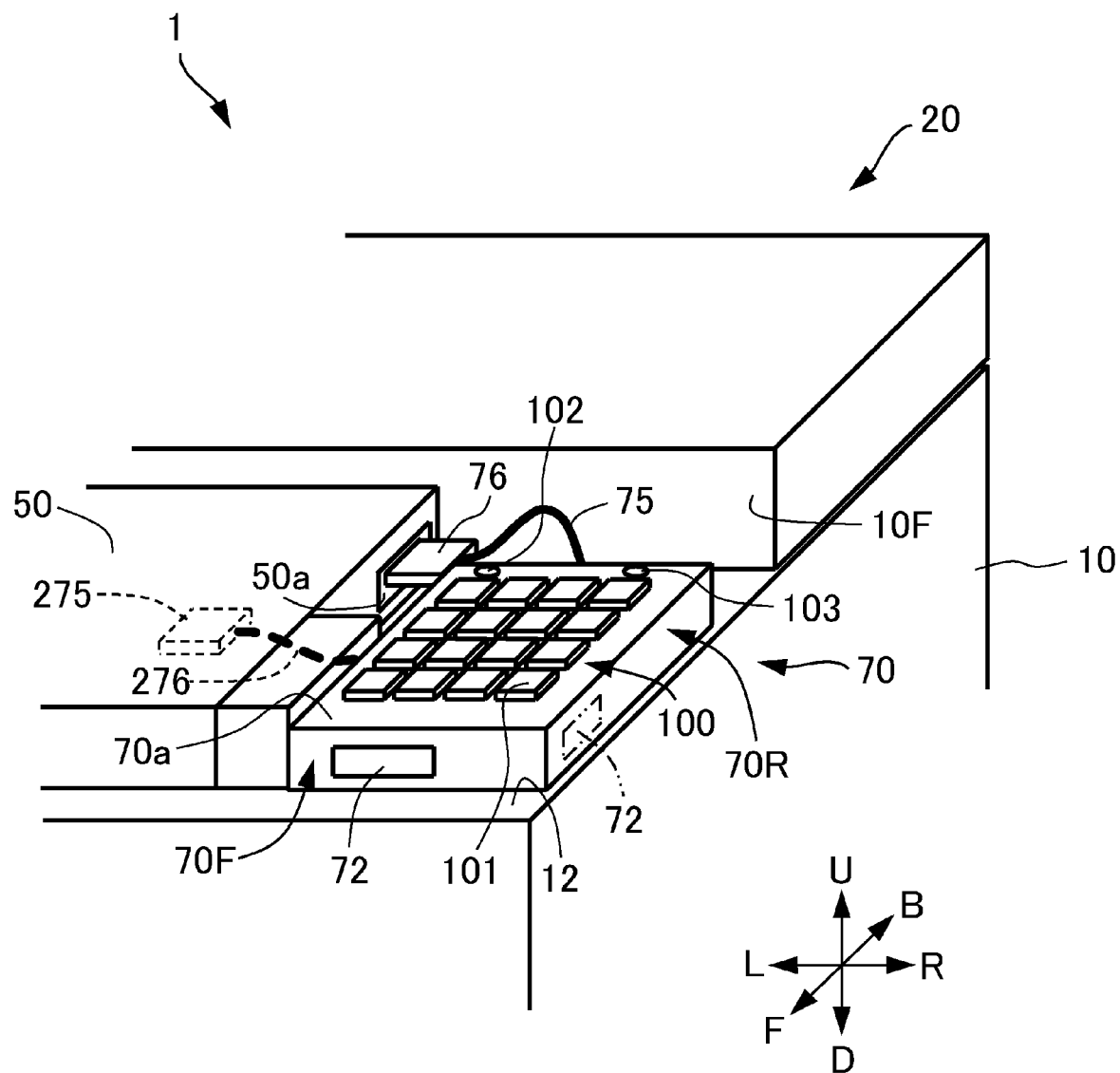
FIG. 10 is a perspective view showing a numerical key unit of an image forming apparatus according to a fourth embodiment.
Figure 11:
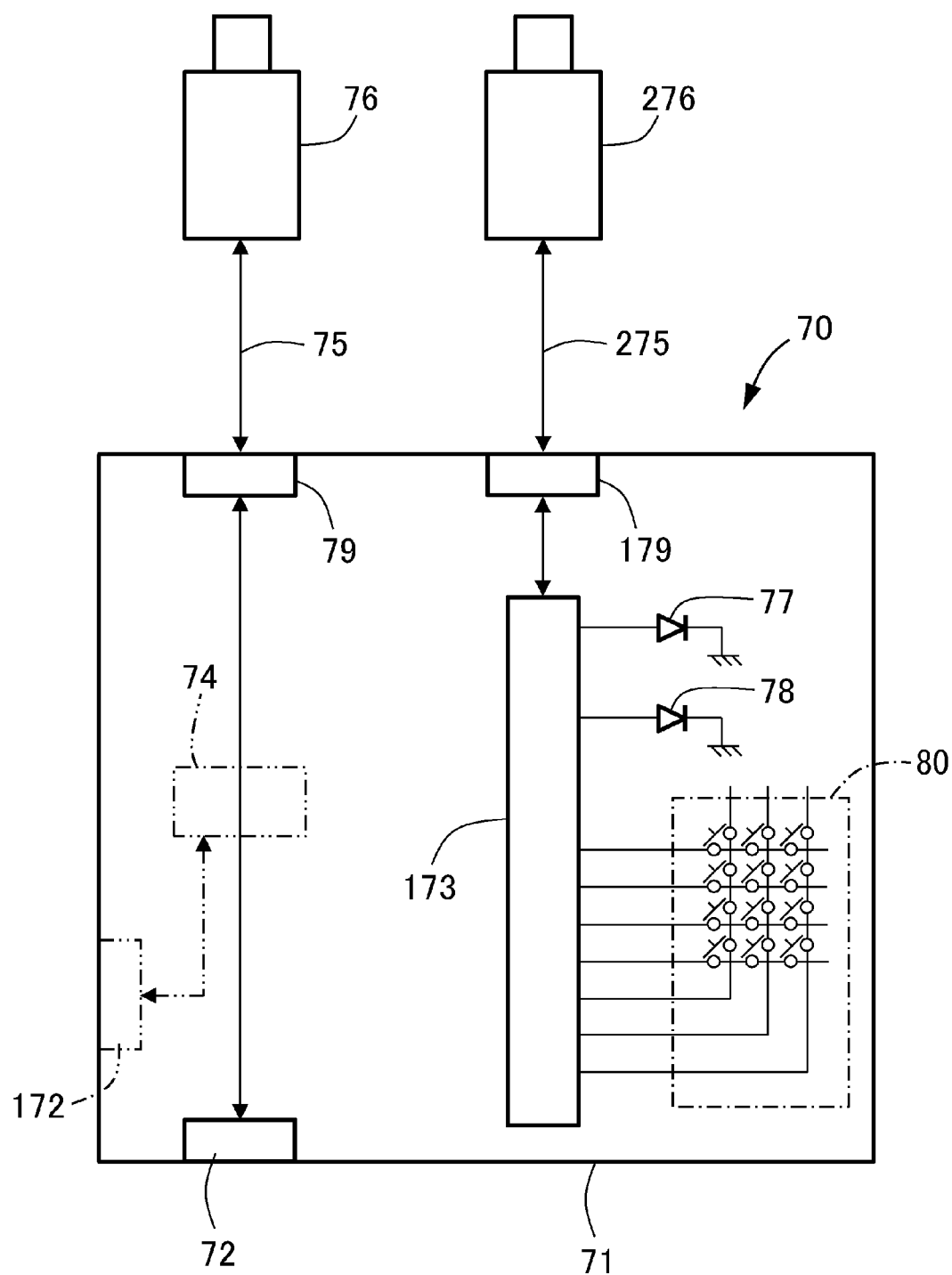
FIG. 11 is a control block diagram of the numerical key unit of the image forming apparatus according to the fourth embodiment.

Next, a fourth embodiment of the present invention will be specifically described while making reference to FIG. 10 and FIG. 11. In this embodiment, a constitution is different from the constitution of the first embodiment in that the hardware key unit 80 is connected to the controller 30 without via the micon 73. However, other constitutions are similar to those in the third embodiment, and the same reference numerals or symbols are used and detailed description will be omitted.

In this embodiment, the hardware key unit 80 and the LEDs 77 and 78 are integrated with an inner connector 173, and are connected to a control substrate (not shown) of the operating portion 50 via the second substrate connector 179, a connecting cable 275, and a connector 276. That is, control of the hardware key unit 80 and the LEDs 77 and 78 is carried out by the micon 51 in the operating portion 50 or by the controller 30 of the image forming apparatus 1. There-fore, in this embodiment, the second substrate connector 179, the connecting cable 275, and the connector 276 are an example of the communication portion and are an example of the connecting portion. The external USB port 72 is connected to the first substrate connector 79, and is capable of communicating with the CPU in the operating portion 50 via the USB port 50a. The connecting cable 275 is capable of directly inputting an ON/OFF state of the hardware key unit 80 to the controller 30 of the apparatus main assembly 10, and the hardware key unit 80 is connected to the apparatus main assembly 10 via the connecting cable 275.

As shown in FIG. 10, the USB connector 76 of the numerical key unit 70 is inserted into the USB port 50a provided on the side surface 50R of the operating portion 50 on the right side R. Further, the connector 276 passes through an inside of the operating portion 50 and is connected to an unshown control substrate or an unshown connector coming out of the control substrate. In this embodiment, the external USB port 72 of the numerical key unit 70 is disposed on the side surface 70F of the numerical key unit 70 on the front side, but may also be disposed on the side surface 70R of the right side R. That is, the external USB port 72 may also be disposed on the front side F than the operating keys 100 and may also be disposed on the right side R than the operating keys 100 in the case where the operating keys 100 are viewed from the front side.

Also, by this embodiment, the external USB port 72 is disposed on the side surface 70F of the numerical key unit 70 on the front side F, so that the external USB port 72 is provided so that the user has access thereto from the front side F of the apparatus main assembly 10. For this reason, a lowering in access property to the external USB port 72 for permitting mounting of the USB memory or the like can be suppressed even while mounting the numerical key unit 70 for external attachment including the operating keys 100 comprised of the hardware keys.

Incidentally, in this embodiment, the case where the connector 276 of the connecting cable 275 is connected to the control substrate of the operating portion 50 was described, but the present invention is not limited thereto. For example, the connector 276 of the connecting cable 275 may also be connected to an unshown port of the external input/output circuit 40 (see FIG. 2) of the controller 30 as in the connector 176 (see FIG. 8) in the third embodiment.

OTHER EMBODIMENTS

In the above described embodiments, the numerical key unit 70 in which the arrangement of the operating keys 100 is in the form of 4 columns×4 rows=16 (keys) was described, but the present invention is not limited to this. For example, as shown in FIG. 12, operating keys 200 may also be a numerical key unit 170 including a numerical key portion 210, an operating key portion 230, and a setting key portion 240.

Figure 12:
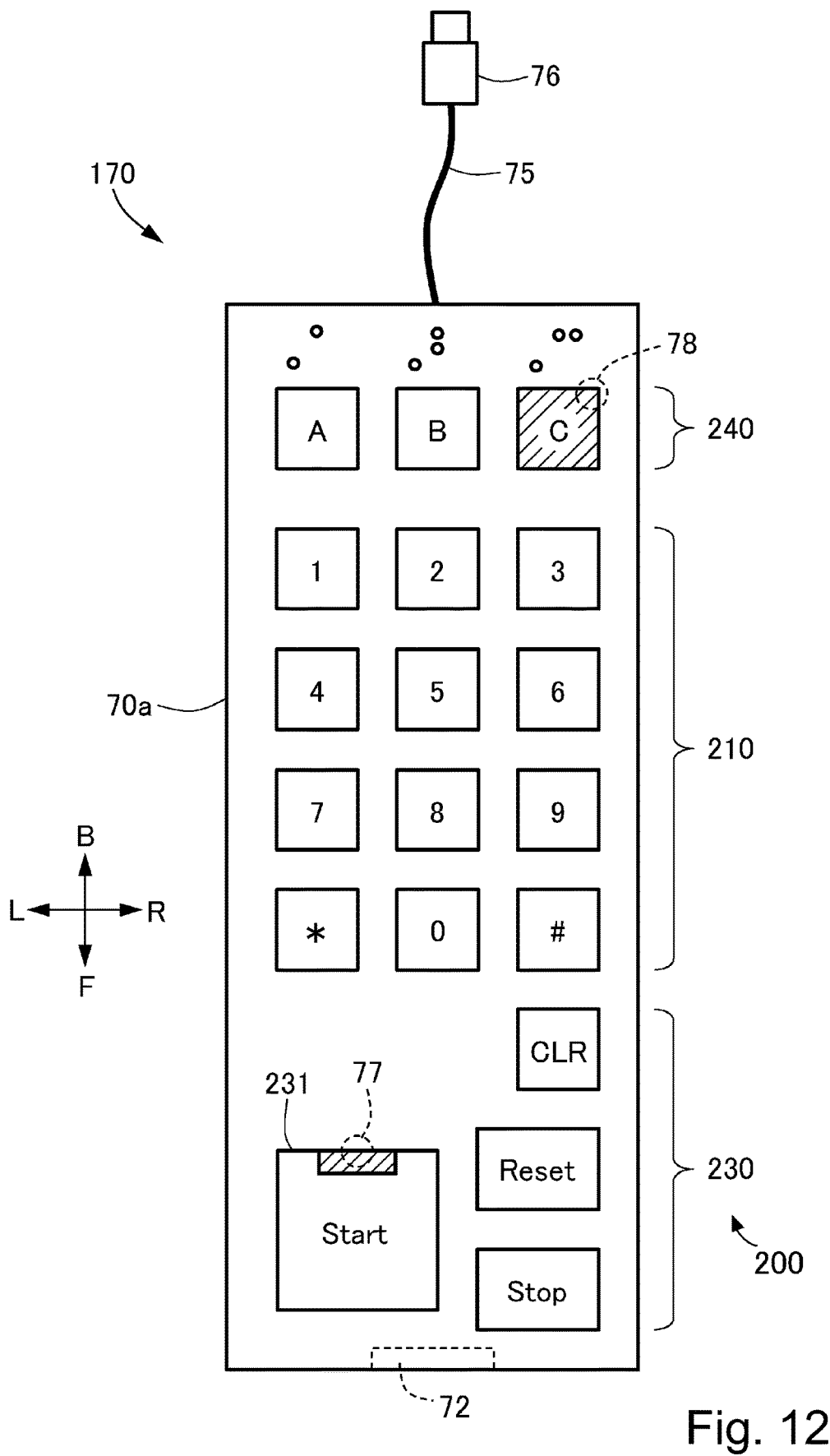
FIG. 12 is a plan view of a numeric key unit of the image forming apparatus according to this embodiment.

Here, FIG. 12 is a schematic view in which the numerical key unit 170 is viewed from the top side, and is the schematic view in which the numerical key unit 170 is viewed from a direction parallel to a pushing down direction of the respective hardware keys. Incidentally, the top side view (position) in this embodiment is a position where numerical values provided for the numerical keys are properly viewed in the up down direction.

The numerical key portion 210 includes a plurality of hardware keys capable of inputting information on at least numerical values. The operating key portion 230 includes, for example, a start key 231 comprised of a hardware key capable of inputting information for starting predetermined processing. The predetermined processing herein is, for example, copying processing of the image forming apparatus 1, transmission processing of the facsimile, or image reading processing of the image reading portion 20, and a start of execution of these pieces of the processing can be instructed by pushing down of the start key 231. The start key 231 is disposed in front of the numerical key portion 210 in a state in which the casing 70a is mounted on the image forming apparatus 1. Further, the operating key portion 230 includes, in addition to the start key 231, a stop key, a reset key, a clear key, and the like. Here, the stop key is a hardware key capable of inputting an instruction to stop the predetermined processing started in response to pressing down of the start key 231. Further, the reset key is a hardware key capable of inputting information for resetting setting inputted to the image forming apparatus 1, and the clear key is a hardware key capable of inputting information for clearing numerical value data inputted via the numerical key portion 110.

Further, the first LED 77 emits light, for example, in the case where the image forming portion 22 (see FIG. 1) is in an image formable state and can be turned off in the case where the image forming portion 22 is not in the image formable state. Further, the second LED 78 emits light in the case where a mode of the image forming apparatus 1 is a predetermined mode, for example, a voice input mode in which a user is prompted to perform an inputting operation of the image forming apparatus 1 by voice, and can be turned off in the case where the mode of the image forming apparatus 1 is not the predetermined mode.

Here, the numeric key unit 170 in this embodiment a dedicated numeric key unit 170 designed, for the image forming apparatus 1, as one of options of the image forming apparatus 1. Uses of this dedicated numeric key unit 170 are principally, for example, input of a designation number (FAX number) when facsimile transmission is made. The dedicated numeric key unit 170 is designed for principal purpose of inputting the designation number of the facsimile transmission, and therefore, an arrangement of the numeric key portion 210 is similar to an arrangement of a telephone. That is, the arrangement of the numeric key portion 210 of the numeric key unit 170 is similar to a standard arrangement shown in Recommendation E.161 of ITU-T (International Telecommunication Union-Telecommunication Standardization Sector). That is, as shown in FIG. 12, in the numeric key portion 210, the numerical keys from 1 to 9 are adjacently disposed so that a rearmost side B includes 1 to 3, a front side F thereof includes 4 to 6 and a further front side F thereof includes 7 to 9. Further, a numerical key of 0 is disposed on the front side F of the numerical key of 8, and the "*" key and the "#" key and disposed on left and right sides thereof. That is, the numerical keys from 1 to 9 are aligned and arranged in a matrix of 3×3 in the case where the numerical key unit 170 is viewed from the front side, so that from an upper stage in a column direction, the numerical keys from 1 to 3, the numerical keys from 4 to 6, and the numerical keys from 7 to 9 are sequentially disposed, and the numerical key of 0 is disposed on a further lower stage than the row of the numerical keys from 7 to 9.

In other words, with respect to the 10 hardware keys from 0 to 9, a row of the numerical keys of 1, 2 and 3 is disposed on the rearmost side, and a row of the numerical keys of 4, 5 and 6 is disposed on a side in front of the row of 1, 2 and 3. Further, a row of the numerical keys of 7, 8 and 9 is disposed on a side in front of the row of the numerical keys 4, 5 and 6. Further, the hardware key of 0 is disposed on a side in front of the row of the hardware keys of 7, 8 and 9. Further, when these numerical keys from 0 to 9 are viewed in column, from a left(-hand) side, these numerical keys are arranged in the order of a column of the numerical keys 1, 4 and 7, a column of the hardware keys 2, 5, 8 and 0, and a column of the numerical keys 3, 6 and 9. Incidentally, the numerical key of 0 may also be disposed in the column of the numerical keys of 1, 4 and 7 or in the column of the hardware keys of 3, 6 and 9, and the arrangement of the "*" key and the "#" key may appropriately be changed. Further, in this numeric key unit 170, electronic calculator input is not a principal purpose, and therefore, four arithmetic operators such as +, −, and the like are not provided. Thus, this numeric key unit 170 is not designed for the purpose of being connected to a PC, and therefore, is different in key arrangement from a general-purpose numeric key unit connectable to unspecified PCs and so on.

Here, the key arrangement of the general-purpose numeric key unit is the same as principally the key arrangement of the electronic calculator. That is, in the general-purpose numeric key unit, an arrangement of hardware keys is similar to the arrangement to hardware keys defined in ISO (International Standards Organization), and with respect to the 10 hardware keys from 0 to 9, a row of the numerical keys of 7, 8 and 9 is disposed on the rearmost side, and a row of the numerical keys of 4, 5 and 6 is disposed on a side in front of the row of 7, 8 and 9. Further, a row of the numerical keys of 1, 2 and 3 is disposed on a side in front of the row of the numerical keys 4, 5 and 6. Further, the hardware keys of 0 and 00 is disposed on a side in front of the row of the hardware keys of 1, 2 and 3. Further, when these numerical keys from 1 to 9 are viewed in column, from a left(-hand) side, these numerical keys are arranged in the order of a column of the numerical keys 1, 4 and 7, a column of the hardware keys 2, 5 and 8, and a column of the numerical keys 3, 6 and 9. The hardware keys of 0 and 00 are disposed so as to bridge over the column of the numerical keys of 1, 4 and 7 and the column of the numerical keys of 2, 5 and 8, or are disposed in the same row as the row of 1, 4 and 7. In other words, the numerical keys from 1 to 9 are aligned and arranged in a matrix of 3×3 in the case where the numerical key unit 70 is viewed from the front side, so that from an upper stage in a column direction, the numerical keys from 7 to 9, the numerical keys from 4 to 6, and the numerical keys from 1 to 3 are sequentially disposed, and the numerical key of 0 is disposed on a further lower stage than the row of the numerical keys from 1 to 3. Further, on a right(-hand) side and on a rear side of the numerical keys, four arithmetic operators a functional key portions, and the like are disposed. Thus, the numeric key unit 170 and the general-purpose numeric key unit are different from each other in numerical key arrangement, function key, and the like provided therein.

Also, by this embodiment, the external USB port 72 is disposed on the side surface F of the numerical key unit 170 on the front side F, and the external USB port 72 is provided so that the user has access thereto from the front side of the apparatus main assembly 10. For this reason, a lowering in access property to the external USB port 72 for permitting mounting of the USB memory or the like thereto even while mounting the numerical key unit 170 for external attachment including the operating keys 200 comprised of the hardware keys can be suppressed.

INDUSTRIAL APPLICABILITY

According to the present invention, the input device and the image forming apparatus which are capable of suppressing a lowering in access property to the USB port for permitting mounting of the USB memory or the like even while mounting the input device for external attachment including the numerical value key portion and the start key which are comprised of the hardware keys are provided.

The present invention is not restricted to the foregoing embodiment, but can be variously changed and modified without departing from the spirit and the scope of the present invention. Accordingly, the following claims are attached hereto to make public the scope of the present invention.

This application claims the Conventional Priority from Japanese Patent Application 2019-018768 filed Feb. 5, 2019, all disclosure of which is incorporated by reference herein.

The invention claimed is:

1. An input device mountable on an image forming apparatus that includes an image reading portion configured to read an image of an original, an image forming portion configured to form the image on a recording medium on the basis of a reading result of the image reading portion, and an operating portion including a display screen configured to display a software execution key, as a software key, to provide an instruction of a start of reading the image to the image reading portion, the input device comprising:
    a plurality of numerical keys capable of inputting information on numerical values of at least 0 to 9, the numerical keys being arranged as hardware keys;
    a connector provided in a casing of the input device and configured to electrically connect the image forming apparatus and the input device, the connector being configured to output a signal to the image forming apparatus in response to an operation of the numerical keys; and
    a USB port provided in the casing and configured to USB-connect external equipment, which is different from the image forming apparatus, to the input device,
    wherein, as viewed in an up-down direction that the numerical keys are pressed, the USB port is provided on a front side surface of the casing.

2. An input device according to claim 1, further comprising a second USB port provided in the casing and configured to USB-connect the external equipment,
    wherein, as viewed in the up-down direction that the numerical keys are pressed, the second USB port is provided on a side surface on a right side of the casing.

3. An input device according to claim 1, wherein the connector and the USB port are electrically connected to each other inside the casing.

4. An input device according to claim 1, further comprising a light emitting portion configured to emit light by a signal from the image forming apparatus.

5. An image forming apparatus comprising:
    the input device according to claim 1;
    the image reading portion;
    the image forming portion; and
    the operating portion.

6. An image forming apparatus according to claim 5, wherein the operating portion is provided on a front side in a front-rear direction of the image forming apparatus with respect to the image reading portion, and
    wherein the input device is disposed on a right side with respect to the operating portion in a direction perpendicular to the front-rear direction and a vertical direction in a state in which the input device is mounted on the image forming apparatus.

7. An input device according to claim 1, wherein the connector is configured to electrically connect the USB-connected external equipment and the image forming apparatus.

8. An input device according to claim 7, further comprising a USB hub electrically connected to the connector and the USB port,
    wherein the connector is configured to electrically connect the USB-connected external equipment and the image forming apparatus via the USB hub.

9. An input device mountable on an image forming apparatus that includes an image reading portion configured to read an image of an original, an image forming portion configured to form the image on a recording medium on the basis of a reading result of the image reading portion, and an operating portion including a display screen configured to display a software execution key, as a software key, to provide an instruction of a start of reading the image to the image reading portion, the input device comprising:
    a plurality of numerical keys capable of inputting information on numerical values of at least 0 to 9, the numerical keys being arranged as hardware keys;
    a connector provided in a casing of the input device and configured to electrically connect the image forming apparatus and the input device, the connector being configured to output a signal to the image forming apparatus in response to an operation of the numerical keys; and
    a USB port provided in the casing and configured to USB-connect external equipment, which is different from the image forming apparatus, to the input device,
    wherein, as viewed in an up-down direction that the numerical keys are pressed, the USB port is provided on a right-side surface of the casing.

10. An input device according to claim 9, further comprising a second USB port provided in the casing and configured to USB connect the external equipment to the input device,
    wherein, as viewed in the up-down direction that the numerical keys are pressed, the second USB port is provided on a side surface on a front side of the casing.

11. An input device according to claim 9, further comprising a USB hub electrically connected to the connector and the USB port,
    wherein the connector is configured to electrically connect the USB-connected external equipment and the image forming apparatus via the USB hub.

12. An input device according to claim 9, wherein the connector and the USB port are electrically connected to each other inside the casing.

13. An input device according to claim 9, further comprising a light emitting portion configured to emit light by a signal from the image forming apparatus.

14. An image forming apparatus comprising:
    the input device according to claim 9;
    the image reading portion;
    the image forming portion; and
    the operating portion.

15. An image forming apparatus according to claim 14, wherein the operating portion is provided on a front side in a front rear direction of the image forming apparatus with respect to the image reading portion, and
    wherein the input device is disposed on a right side with respect to the operating portion in a direction perpendicular to the front rear direction and a vertical direction in a state in which the input device is mounted on the image forming apparatus.

16. An input device according to claim 9, wherein the connector is configured to electrically connect the USB connected external equipment and the image forming apparatus.

* * * * *